Nov. 26, 1957  H. L. JOYCE  2,814,257
MINIATURE POWERED VEHICLE
Filed Feb. 12, 1952
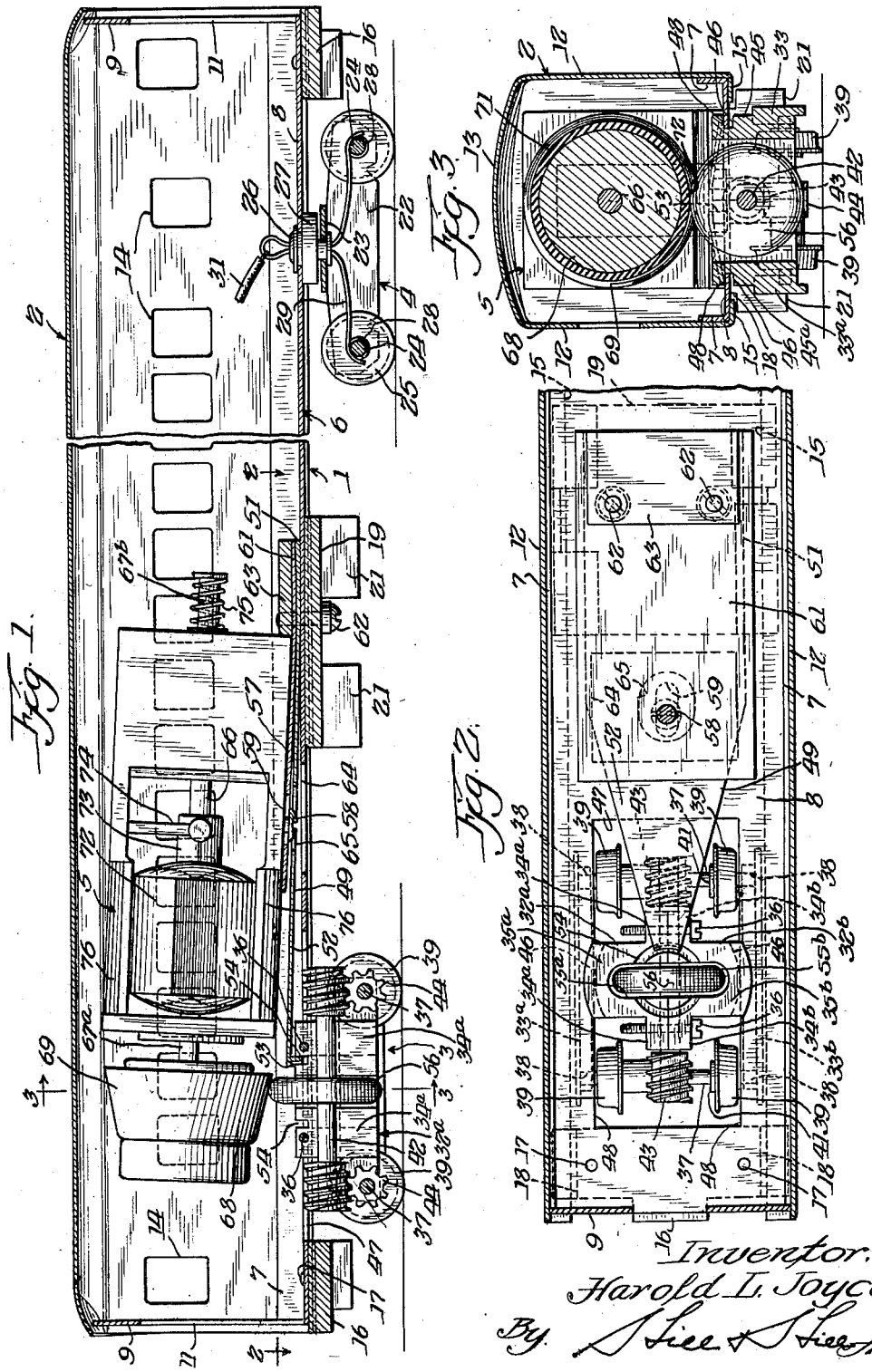
Inventor.
Harold L. Joyce.
By

United States Patent Office 2,814,257
Patented Nov. 26, 1957

2,814,257

MINIATURE POWERED VEHICLE

Harold L. Joyce, Hartford City, Ind.

Application February 12, 1952, Serial No. 271,160

23 Claims. (Cl. 105—49)

The invention relates generally to miniature or toy vehicles, and is particularly applicable to a motive power structure for miniature trains, and the like.

The present invention is particularly adapted for use in miniature train structures of power coach type, wherein the general appearance of the car is somewhat similar to the standard style railroad coach, but is self-powered. Actual coaches of this type are in common use on interurban lines, and the like, where self-powered passenger vehicles are desirable, as distinguished from the usual railroad passenger cars which must be drawn by a separate locomotive, or other power unit. As such types of self-powered coaches employ wheels of approximately the same size as the usual powerless coaches and similar supporting trucks, the production of a miniature or model coach, particularly if a very small scale is employed, introduces a number of problems in connection with power transmission from the electric motor, or other power source, to the relatively small driving wheels, this being further complicated by the fact that the trucks must of necessity be pivotally connected to the coach to permit the negotiation of curves. In the past, numerous methods have been employed to achieve satisfactory power transmission structure in miniature vehicles of this type which will permit the necessary pivotal action in the car trucks. Where the coach is designed for two-rail operation, the truck must also be utilized to pick up electric current for the actuation of the electric motor. The majority of the past constructions have utilized, in one form or another, a resilient belt drive between the motor and the power transmitting mechanism of the truck structure, such belts commonly taking the form of either a rubber band or an endless spring. In either case, considerable friction is introduced in the moving parts, as such belts must of necessity utilize considerable tension, all of which results in added wear on bearings, and the like, as well as resulting in jerky starts as the current is applied to the motor, instead of the smooth starts normally associated with full sized cars.

Another problem involved in the production of model structures of this type results from the necessity of pivoting the power truck to the frame or body structure, such pivotal connection being located on the longitudinal center line of the car, and as the pivotal bearing surfaces are of necessity small and normally positioned adjacent the longitudinal center line of the car, the car body has a tendency to rock transversely with respect to the car truck, this action being accented by the motor torque, particularly during starts and stops of the vehicle.

The present invention therefore has among its objects the production of a powered, miniature vehicle structure which substantially eliminates all of the disadvantages and difficulties above mentioned, and enables the production of even very small models as, for example, those utilizing a scale of 1/10" to a foot.

Thus, the present invention has among its objects, the production of a power transmission structure for miniature vehicles which may be extremely small in size, eliminating the use of relatively high tension belt drives, and the like and which is extremely simple in design.

Another object of the invention is the production of such a power transmission structure in which effective swiveling action of the power truck is achieved, together with high stability between the truck and body or frame structure, and which, at the same time, may be readily attached to or detached from the vehicle body, and in which relatively large bearings may be employed with consequently improved wearing qualities.

A further object of the invention is the production of a novel miniature power truck structure which is exceedingly simple in design, comprising only two separate parts other than the movable driving elements, and which is so designed that while the finished structure is exceedingly small in size, the component parts, including necessary securing means, are comparatively large, and which structure does not require adjustments in the assembly thereof.

A further object of the invention is the production of such a novel power transmission structure in which adequate engagement of the driving parts is achieved by very simple construction employing a minimum of parts, and in which a means of varying the power or speed ratios between the motor and the driving wheels may be readily achieved, either by manual adjustment, or automatically, while the vehicle is in operation.

A further object of the invention is the production of such a structure which, if desired, readily adapts itself for a dual drive, wherein a single motor may be employed to actuate a pair of power trucks rather than merely one truck of the vehicle.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters represent like or corresponding parts:

Fig. 1 is a longitudinal section through a miniature vehicle embodying the present invention;

Fig. 2 is a plan section taken approximately on the line 2—2 of Fig. 1; and

Fig. 3 is a transverse section taken approximately on the line 3—3 of Fig. 1.

The present invention contemplates the use of a power truck which is pivotally connected to the car body or frame for partial rotation about a centrally positioned vertical axis, in which the driving forces between the motor and truck wheels are applied from the driving element of the motor to the driven element of the truck structure at a point substantially on the pivotal axis of the truck member, this being accomplished in the embodiment of the invention illustrated, by engagement between a rotatable driving element actuated by the motor, and a rotatable driven element carried by the power truck, with the point of engagement between the driving and driven elements being located substantially on the vertical, pivotal axis. In the embodiment of the invention illustrated, the rotatable driving element is so designed that by varying its axial position with respect to the driven element, the ratio between the two elements may be varied, either by manual adjustment, or automatically during operation of the vehicle.

Referring to the drawings, 1 indicates generally a miniature vehicle or car generally similar in appearance to its full sized counterpart, a self-powered passenger coach, and comprising a car structure, indicated generally by 2, supported on a pair of trucks, indicated generally by the numerals 3 and 4, respectively, with the truck 3 providing the motive power produced by an electric motor, indicated generally by the numeral 5. It might be mentioned that the figures in the drawing are made approximately to a scale of 2:1, the car as manufactured, being approximately 6" long, 1" wide, and 1 3/16" high, and being constructed to a scale of substantially 1/10" to a foot. It will be apparent that, in scale models of this size, manufacturing problems are considerably increased due to the small dimensions involved in the various components of the structure.

In the embodiment of the invention illustrated, the car structure is constructed in the form of two members adapted to be readily assembled together to form the complete structure. The bottom of the car, which also forms the frame, is constructed from a piece of suitable sheet metal 6 having its longitudinal edges bent upwardly to form a pair of flanges 7 connected by a bottom member 8. Also integrally formed from the sheet 6 at each end are respective end walls 9, the latter being bent upwardly from the bottom and, if desired, provided with an opening 11 representing a door as well as other openings representing windows, and the like. The body side walls 12 and roof or top 13 likewise are formed from a single sheet of material stamped, or otherwise formed, to the desired shape, and similarly the walls 12 may be provided with openings 14 therein representing windows, etc. As clearly illustrated in Fig. 3, the lower edges of the respective side walls 12 terminate in horizontally positioned, inwardly extending flanges 15 adapted to underlie the longitudinal edge portions of the bottom 8. Thus, the side walls 12 and roof 13, which will hereinafter be generally referred to as the body member, may be readily assembled with the frame and bottom structure formed from the sheet 6, hereinafter referred to as the bottom or frame member, by longitudinally sliding the body 2 along the frame structure, with the flanges 15 underlying the bottom 8. Vertical movement of the body relative to the frame structure is prevented by the end walls 9, as well as by a pair of transversely extending members 16, each positioned adjacent one end of the bottom 8, and underlying the same, the members 16 being secured to the bottom 8 by any suitable means, as for example by rivets 17, or the like, passing through the car bottom. The transverse edge portions of the members 16 adjacent the longitudinal edges of the car body are downwardly offset, as indicated at 18, to provide a slot or channel between the upper surface of the offset portion, and the lower surface of the car bottom, of a size to receive the flanges 15, thus restricting downward movement of the body 2 relative to the frame structure. The portions of the members 16 which are exposed at the sides of the car may readily be formed to simulate steps, thus adding to the detail in the model. Positioned adjacent the longitudinal center of the car is a member 19 which is similarly constructed to the members 16, and as illustrated in Fig. 3, likewise is provided with the offset portion 18 forming slots or grooves for the reception of the flanges 15, the member 19 being suitably formed, as in the shape of tanks 21, or other appurtenances, normally found in full sized vehicles of this type, thus also adding to the physical detail in the final structure.

The truck 4 is of any suitable construction, and in the embodiment of the invention illustrated, comprises a pair of longitudinally extending side members 22 (only two of which are illustrated in Fig. 1) connected adjacent their top edges by a cross portion 23. Extending between the two portions 22 is a pair of axles 24, each of which carry a pair of wheels 25. The truck 4 is connected to the bottom 8 by a hollow rivet 26 which passes through the cross portion 23 of the truck, and through a bushing 27 carried by the car bottom 8. As the embodiment of the invention illustrated is adapted for two-rail operation, the wheels engaging one of the rails are suitably insulated as, for example, by an insulating sleeve 28 from the axle, the other two wheels being directly connected to the axle so that electric current may be conducted from the rail into the axles. Thus in this construction the bushing 27 is constructed from an insulating material, thereby insulating the truck 4 from the car structure. The current is received from the car axles by a suitable spring contact element 29 which extends up through the hollow rivet 26, and by means of suitable conductor 31, is operatively connected to the motor 5.

The power truck 3 comprises a truck body member 32 divided longitudinally into a pair of sections, indicated generally by the numerals 32a and 32b, the juncture of the two sections being positioned on the longitudinal center line of the truck and car structure. As more clearly illustrated in Fig. 2, each of the sections 32a and 32b are generally H-shaped in horizontal plane, and comprise respective outer leg portions 33a and 33b, and inner leg portions 34a and 34b connected by intermediate connecting portions 35a and 35b, respectively. The two sections 32a and 32b are secured together along the meeting edges of the legs 34a and 34b by any suitable means as, for example, screws 36 passing through the legs 34b and threaded into the legs 34a, thus rigidly securing the two sections together. Extending between opposite end portions of each pair of corresponding legs 33a and 33b are respective axles 37, the free ends of the axles being positioned in respective bores 38 in the legs, and rigidly carried by each axle 37 is a pair of traction wheels 39, the wheels 39 on the opposite side of the car with respect to the insulated wheels on the truck 4 being likewise insulated by suitable bushings or sleeves 41. Also rotatably mounted in the truck body 32 is a longitudinally extending shaft 42, the axis of which is positioned at the juncture of the sections 32a and 32b so that half of the bore in which the shaft 42 is carried is located in each of the sections, as clearly illustrated in Fig. 2. The leg portions 34a and 34b are shorter in length than the leg portions 33a and 33b, and positioned adjacent the ends of such leg portions and rigidly carried by the shaft 42 is a pair of worm wheels 43, the latter being operatively connected with respective axles 37 by means of gears 44 rigidly mounted on the respective axles.

As illustrated in Fig. 3, the connecting portions 35a and 35b extend above the leg portions 33a and 33b, with the outer faces 45a and 45b of such portions being provided with respective horizontally and longitudinally extending arcuate-shaped grooves 46, the faces 45a and 45b, in the embodiment of the invention illustrated, likewise being arcuate or cylindrically shaped. The bottom 8 of the car body is provided with an elongated opening 47 which, as illustrated in the drawings, is rectangularly shaped, forming longitudinally extending frame members 48 along opposite sides of the truck 3, with the connecting portions 35a and 35b extending up into the opening 47, and the frame portions 48 positioned in the slots 46. Referring to Figs. 2 and 3, it will be noted that the arcuate slots 46 are cut on a common diameter approximately equal to or slightly less than the transverse distance between the frame members 48, whereby the truck is free to pivot about the axis of the generation of the slots 46.

Longitudinal movement of the truck relative to the car frame and body is restricted by a resilient, leaf-type spring member 49, one end 51 of which is connected to the bottom 8, and the edges adjacent the opposite end of the member 49 converge to form a triangularly shaped portion 52, the free end of which is provided with a downwardly extending, arcuate-shaped flange 53, which is of a size to enter a circular groove or channel 54 formed in the upper face of the truck body comprising the upper faces of the connecting portions 35a and 35b, as well as the corresponding faces of the legs 34a and 34b of the two sections, the latter legs being of substantially the same height as the connecting portions 35a and 35b, as clearly illustrated in Fig. 1. It will be apparent that the flange 53 and the groove 54 cooperate to restrict longitudinal movement of the truck relative to the car body.

and frame but, at the same time, permitting normal pivotal movement of the truck as the axis of generation of the slot 54 falls on the axis of generation of the longitudinally extending arcuate channels or grooves 46. Each of the sections 35a and 35b are provided with a recess 55a and 55b opening on the meeting faces of the legs 34a and 34b, respectively, and extending transversely outwardly from the pivotal axis of the truck into the respective intermediate connecting portions 35a and 35b of the two truck sections. As clearly illustrated in Fig. 2, the recesses 55a and 55b are oppositely disposed with respect to each other, and form a composite recess in the truck, in which is positioned a rotatable driven member which, in the embodiment of the invention illustrated, is in the form of a roller 56, the latter being rigidly carried by the shaft 42.

The electric motor 5, all of the details of which are not illustrated, may be of any suitable type as, for example, a permanent magnet type motor, such as that commonly employed in small electric car models, and which is readily procurable on the open market. The motor 5 is connected to the bottom 8 of the car structure by means of a relatively resilient leaf or plate member 57, the motor being secured to the member 57 by a screw 58 passing through an elongated slot 59 in the member 57 adjacent the free end thereof with the opposite end 61 of the member 57 being secured to the bottom 8. This is accomplished by means of a pair of screws 62 extending through the member 19, ends 51 and 61 of the respective members 49 and 57, and threaded into a retaining plate or block 63, whereby the screws 62 rigidly secure the ends 51 and 61, as well as the member 19 to the car bottom. As illustrated in Figs. 1 and 2, the car bottom is provided with a second opening 64 therein, and the leaf member 49 is provided with a suitable opening 65 therein, with the openings 64 and 65 being suitably aligned to expose the screw 58 threaded into the motor 5. Thus the screw 58 is readily accessible to permit removal of the motor 5, or adjustment thereof with respect to the member 57, without disassembling any of the other parts of the structure. In the embodiment of the invention illustrated, the driving shaft 66 of the motor is double ended, as indicated at 67a and 67b, with the end 67a of the shaft having rigidly mounted thereon a rotatable driving member ilustrated in the form of a roller 68 engageable with the driven roller 56 carried by the power truck 3. The roller 68 is illustrated as being generally conical in shape, with the portion of largest diameter being positioned adjacent the inner portion of the shaft end 67a, and the portion of smaller diameter adjacent the free end of the shaft, with the engaging face 69 of the roller 68 being produced by a layer 71 of semi-resilient material, such as rubber, or the like.

As clearly illustrated in Fig. 3, the axis of the driving shaft 66 is longitudinally aligned with the axis of the shaft 42, intersecting the pivotal axis of the truck, and as the driven roller 56 is axially located along the shaft 42 at the pivotal axis of the truck, the point of contact 72 between the driving roller 68 and driven roller 56 falls substantially on the pivotal axis of the truck. Consequently, pivotal movement of the truck has relatively little effect on the driving connection between the two rollers, resulting in the effective transmission of power from the motor 5 to the traction wheels 39, irrespective of the curvature of the rails upon which the wheels 39 run. As the member 57 which carries the motor 5 is of spring material and is arched slightly upwardly above what would be its normal free position, it exerts a spring action or force on the motor 5, and through the driving shaft 42, on the roller 68, tending to urge the same downwardly into engagement with the driven roller 56, and thereby effectively maintains the driving roller in engagement with the driven roller at all times.

The member 52, in addition to its function of restricting longitudinal movement of the truck relative to the car body, also forms a conductor for the transmission of current from the uninsulated wheels 39 through the axles and truck to the car body, to which one side of the motor would be connected, the other side of the motor being connected, as previously described, by means of the conductor 31 to the opposite rail through the truck 4.

It will be noted that in the construction illustrated, utilizing a conical or tapered driving roller 68, the ratio between the driving shaft of the motor and the traction wheels 39 will be dependent upon the axial position of the driving roller 68 with the driven roller 56, the ratio being increased when the driven roller 56 engages that portion of the roller 68 of relatively large diameter, and decreased when the driven roller 56 is engaged by the portion of relatively small diameter of the roller 68. Thus, assuming the motor 5 is of standard construction, with the driving shaft thereof being axially fixed relative to the remaining elements of the motor, the driving contact of the roller 68 with the roller 56 may be axially varied by adjustment of the motor 5 relative to the member 56, the slot 59 permitting such adjustment when the screw 58 is loosened. As the diameter of the driving roller 68, in the construction illustrated, is greater than the diameter of the driven roller 56, it will be apparent that higher speed will result when the roller 69 is in the position illustrated in Fig. 1, with the ratio decreasing as the motor and driving roller are moved rearwardly, thereby decreasing the effective diameter of the driving roller. It will be apparent that the present invention thus enables the operator to readily and easily manually adjust the power transmission structure.

Automatic adjustment of the speed ratio may also readily be achieved whereby the driving roller 68 may be axially shifted during operation of the vehicle, such a structure being illustrated in the drawings, and in this construction, the motor 5 utilizes a double ended driving shaft 66, the opposite ends of which, 67a and 67b, extend from the respective ends of the motor. In this construction, the driving shaft 66 and the armature 72 are axially slidable with respect to the remainder of the motor structure, this being achieved by proportioning the parts so that there is a desired amount of end play in the shaft 66. Likewise, the commutator 73, engageable by a suitable brush structure 74, is so proportioned as to permit such end play, and, at the same time, maintain the commutator 73 in operative engagement with the brushes 74. The shaft is normally urged in a rearwardly direction, as viewed in Fig. 1, by a suitable spring 75 which tends to axially move the shaft, armature, and roller 69 in a rearward direction to bring the portion of the roller 68 of smaller diameter into engagement with the driven roller 56. Consequently, prior to the application of power to the motor 5, the armature would be at the rearward end of its axial travel, with the small portion of the roller 68 in engagement with the driven roller 56; but as additional power is applied to the motor 5, the armature will tend to move axially forward to bring it in closer relation with the operating portions 76 of the motor pole pieces, with the result that the armature will eventually assume the position illustrated in Fig. 1, bringing the portion of larger diameter of the roller 68 into engagement with the driven roller 56, thereby increasing the speed ratio as the vehicle is traveling.

It will be noted that the present construction provides a very efficient transmission of power from the motor 5 to the traction wheels 39, with the spring member 57 applying merely sufficient force to the roller 68 to produce a good driving contact between the latter and the driven roller 56. Likewise, the construction of the power truck 3, is such that the wear on the bearing portions supporting the shaft 42, and the bearing portions supporting the axles 37, more or less compensate for one another, resulting in relatively long wear and, at the same time, maintaining smooth operation under continuing wear on the bearings. It will also be noted that the complete power truck, other than the moving parts, requires only two members 32a and 32b, together with the securing screws 36 and is so designed that adjustments in the assembly thereof are eliminated, as efficient manufacture of the two sections of the truck body insures proper assembly. The construction also enables the truck to be readily detached or attached to the frame structure merely by raising the free end of the spring member 49 to disengage the flange 53 from the slot 54, thereby permitting the truck to be pivotally rotated a sufficient distance to disengage the arcuate slots 46 from the frame structure. As the groove 54, which is adapted to receive the flange 53 of the member 49, extends on both sides of the driven pulley 56, the truck may be attached to the frame structure with either pair of wheels in the forward position, thereby enabling the insulated wheels to be engaged with either rail member, as desired.

It will be particularly noted that as the power truck is connected to the frame structure at points relatively close to the side walls of the car body, as distinguished from adjacent the pivotal point of the truck, such as illustrated in connection with the truck 4, side sway or rocking of the frame and body with respect to the truck is materially reduced. It will be apparent that as the motor torque tends to rock the body relative to the truck, particularly during changes in the application of current to the motor either in starting or stopping the car, this feature is of considerable advantage in achieving realistic operation.

While I have illustrated the present invention in connection with a vehicle or car utilizing a pair of trucks, only one of which has power applied thereto, it is believed apparent that the present invention readily adapts itself to a dual drive construction merely by extending the end 67b of the motor drive shaft 66, and constructing the opposite end of the car in the same manner as that described in connection with the mounting of the power truck 3 and replacing the truck 4 with a duplicate power truck 3, whereby the driven roller of the second truck may be driven from a second roller carried by the end 67b of motor driving shaft 66. If tapered or conical rollers are employed in this construction, they would, of course, be similarly positioned to insure a uniform transmission of power to both trucks, and if desired, the driving rollers in this construction could be made of uniform diameter, thus eliminating the automatic variable ratio feature. Likewise, the member 57 may either be so shaped or mounted as to position the driving shaft of the motor substantially horizontal, rather than at the slight angle illustrated in Fig. 1 of the drawing. Obviously, such a dual drive would be substantially merely a duplication of the structure heretofore described, which could be readily achieved by one skilled in the art.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. In a miniature vehicle, the combination of a frame structure, including a pair of spaced frame members having horizontally extending portions, a truck member having a pair of transversely disposed frame engaging portions operatively positioned between the frame members, said frame engaging portions having longitudinally extending arcuate grooves therein positioned on a common diameter approximately equal to the distance between the horizontally extending portions of the spaced frame members, said grooves being of a width to receive such portions of the frame member whereby the truck member is supported thereby for pivotal movement about the axis of said diameter, and means operatively connecting said frame structure and truck member for restricting longitudinal movement between the latter and said frame structure.

2. In a miniature vehicle, the combination of a frame structure, including a pair of spaced frame members having horizontally extending portions, a truck member having a pair of transversely disposed frame engaging portions, said frame engaging portions having longitudinally extending arcuate grooves therein positioned on a common diameter approximately equal to the distance between the horizontally extending portions of the spaced frame members, said grooves being of a width to receive such portions of the frame member whereby the truck member is supported thereby for pivotal movement about the axis of said diameter, said truck member having an arcuate shaped recess in an upper face thereof generated about said axis, a leaf spring, one end of which is operatively connected to said frame structure, the other end of said spring having an arcuate-shaped downwardly extending flange thereon of a size to be positioned in said arcuate-shaped recess and operative to restrict longitudinal movement between said truck member and said frame structure.

3. In a miniature vehicle, the combination of a frame structure, including a pair of spaced frame members having horizontally extending portions, a wheeled car supporting truck having a pair of transversely disposed frame engaging portions, said frame engaging portions having longitudinally extending arcuate grooves therein positioned on a common diameter approximately equal to the distance between the horizontally extending portions of the spaced frame members, said grooves being of a width to receive such portions of the frame member whereby the truck is supported thereby for pivotal movement about the axis of said diameter, said truck having an arcuate-shaped recess in an upper face thereof generated about said axis, spring means for conducting electrical current from said truck to said frame, one end of which is operatively connected to said frame structure, the other end of said spring having an arcuate-shaped downwardly extending flange thereon of a size to be positioned in said arcuate-shaped recess and operative to restrict longitudinal movement between said truck and said frame structure.

4. In a miniature power vehicle, the combination of a supporting frame structure, power means operatively carried by siad frame and having a rotatable driving shaft, a rotatable conical-shaped driving member operatively connected to said driving shaft, and rotatable on an axis extending longitudinally with respect to the frame structure, a wheel carrying structure pivotally connected to the supporting frame on a vertical axis and demountably connected to the supporting frame by arcuate movement through a predetermined angle to separate the wheel carrying structure from the frame, driven wheels rotatably carried by said wheel carrying structure, a rotatable driven roller member carried by said last-mentioned structure and rotatable about a longitudinally extending axis, means operatively connecting said driven roller member and said wheels for the transmission of power therebetween, the pivotal axis of said wheel carrying member substantially intersecting the axes of said driving and driven members with said driving member engaging said driven member for transmission of power therebetween.

5. In a miniature power vehicle, the combination of a supporting frame structure, power means operatively carried by said frame and having a rotatable driving shaft, a rotatable conical-shaped driving roller member operatively connected to said driving shaft, and rotatable on an axis extending longitudinally with respect to the frame structure, a wheel carrying structure pivotally connected to the supporting frame on a vertical axis, driven wheels rotatably carried by said wheel carrying structure, a rotatable driven roller member carried by said last-mentioned structure and rotatable about a longitudinally extending axis, means operatively connecting said driven roller member and said wheels for the transmission of power therebetween, the pivotal axis of said wheel carrying member substantially intersecting the axes of said conical-shaped driving and driven roller members with said conical-shaped driving roller member engaging said driven roller member for transmission of power therebetween, and means for urging said driving roller member in a direction toward said driven roller member.

6. In a miniature power vehicle, the combination of a supporting frame structure, power means carried by said frame and having a driving shaft rotatable on an axis extending longitudinally with respect to the frame structure, a driving roller carried by and rotatable with said driving shaft, a wheel carrying member pivotally connected to the supporting frame on a vertical axis, driven wheels rotatably carried by said member, a driven roller carried by said member and rotatable about a longitudinally extending axis, means operatively connecting said driven roller and said wheels for the transmission of power therebetween, the pivotal axis of said member substantially intersecting the axes of said driving and driven rollers with said driving roller engaging said driven roller for transmission of power therebetween, and spring means connecting said power means and frame structure and operative to urge said driving roller in a radial direction toward said driven roller.

7. In a motive power structure for miniature vehicles and the like, the combination of power means having a rotatable driving shaft, a rotatable traction wheel, a driving roller operatively connected to said driving shaft, a driven roller, means operatively connecting the latter and said traction wheel, said driven roller being operatively engaged with said driving roller, one of said rollers being of generally conical shape, and automatic speed adjusting means for varying the relative positions of said rollers to vary the effective speed ratio between said driving shaft and said traction wheel.

8. In a motive power structure for miniature vehicles and the like, the combination of power means having a rotatable driving shaft, a rotatable traction wheel, a driving roller carried by and rotatable with said driving shaft, a driven roller, means operatively connecting the latter and said traction wheel, said driven roller being operatively engaged with said driving roller, one of said rollers being of generally conical shape, said driving roller being axially movable along the axis of said driving shaft, and automatic speed adjusting means operatively related to said driving roller operative to urge the same toward one end of its axial movement.

9. In a motive power structure for miniature vehicles and the like, the combination of an electric motor, including a rotatable driving shaft, an armature thereon and cooperable field pole pieces, a driving roller rigidly carried by said driving shaft, a driven roller, means operatively connecting the latter and said traction wheel, said driven roller being operatively engaged with said driving roller, said driving roller being generally conical in shape, said driving shaft being axially movable along its axis of rotation, and with it said armature and driving roller, and spring means operatively related to said driving shaft operative to urge the same in a direction to engage a portion of relatively small diameter of the conical driving roller with the driven roller, in which position of the shaft and upon application of power to said motor, the armature will tend to move axially in opposition to said spring means to bring a portion of said driving roller, of relatively large diameter, into engagement with the driven roller.

10. In a motive power truck structure for miniature vehicles, the combination of a truck body member, the latter being divided into two similarly shaped sections, having a longitudinally extending juncture, means for rigidly securing said sections together, said body having a longitudinally extending bore therein, the axis of which is positioned at said juncture, a shaft rotatably carried in said bore, a transversely extending axle rotatably carried by said body with opposite end portions of said axle being journaled in respective body sections, gear means operatively connecting said shaft and axle for the transmission of power therebetween, said body sections having opposing recesses in their meeting faces, a roller positioned in the composite recess thus formed and rigidly carried by said shaft, said roller being constructed for engagement with, and to be rotated by a cooperable rotatable driving member.

11. In a motive power truck structure for miniature vehicles, the combination of a truck body member, the latter being divided into two similar sections, each generally H-shaped in horizontal section, positioned with the leg of one abutting the leg of the other, means extending between abutting leg portions for rigidly securing said sections together, the abutting legs of said sections being shorter in length than the outer legs thereof, said body having a longitudinally extending bore therein, the axis of which is positioned at the juncture of said sections, a shaft rotatably carried in said bore, a transversely extending axle rotatably carried by said body with opposite end portions of said axle being journaled in a corresponding outer leg of respective body sections, gear means operatively connecting said shaft and axle for the transmission of power therebetween, said body sections having opposing recesses in their meeting faces extending into the respective connecting portions of each H-shaped section, a roller positioned in the composite recess thus formed and rigidly carried by said shaft, said roller being constructed for engagement with, and to be rotated by a cooperable rotatable driving member.

12. In a miniature track operated car structure, the combination of a frame structure forming the car bottom, car end walls carried by said frame structure, a pair of wheeled car supporting trucks pivotally connected to said car bottom, a body member forming the side walls and roof of the car, said side walls and roof being formed as a unit, said side walls terminating at their lower edges in inwardly extending flanges adapted to underlie the side edge portions of said car bottom, and means including transverse end members and an intermediate transverse member carried by said car bottom at the outer face thereof engageable with said flanges, for restricting downward movement of said flanges and side walls relative to said car bottom but allowing longitudinal sliding movement therebetween to permit assembly or disassembly of the frame structure and the body member.

13. A miniature car structure as claimed in claim 12, wherein said last-mentioned means is in the form of simulated appurtenances to the car body.

14. In a miniature track operated car structure, the combination of a frame structure forming the car bottom and including a pair of spaced frame members having horizontally extending portions, a wheeled car supporting truck member having a pair of transversely disposed frame engaging portions, said frame engaging portions having longitudinally extending arcuate grooves therein positioned on a common diameter approximately equal to the distance between the horizontally extending portions of the spaced frame members, said grooves being of a width to receive such portions of the frame member whereby the truck member is supported thereby for pivotal movement about the axis of said diameter, means operatively connecting said frame structure and truck member for restricting longitudinal movement between the latter and said frame structure, said truck body member having an arcuate-shaped recess in an upper face thereof generated about said axis, a leaf spring, one end of which is operatively connected to said frame structure, the other end of said spring having an arcuate-shaped downwardly extending flange thereon of a size to be positioned in said arcuate-shaped recess and operative to restrict longitudinal movement between said truck member and said frame structure, car end walls carried by said frame structure, a second wheeled car supporting truck pivotally connected to said car bottom, a body member forming the side walls and roof of the car, said side walls and roof being formed as a unit, said side walls terminating at their lower edges in inwardly extending flanges adapted to underlie the side edge portions of said car bottom, and means carried by said car bottom at the outer face thereof engageable with said flanges, for restricting downward movement of said flanges and side walls relative to said car bottom but allowing longitudinal sliding movement therebetween to permit assembly or disassembly of the frame structure and the body member.

15. In a miniature power vehicle, the combination of a supporting frame structure including a pair of spaced frame members having horizontally extending portions, power means operatively carried by said frame and having a rotatable driving shaft rotatable on an axis extending longitudinally with respect to the frame structure, a wheel carrying truck member having a pair of transversely disposed frame engaging portions, said frame engaging portions having longitudinally extending arcuate grooves therein positioned on a common diameter approximately equal to the distance between the horizontally extending portions of the spaced frame members, said grooves being of a width to receive such portions of the frame member whereby the truck member is supported thereby for pivotal movement about the axis of said diameter, driven wheels rotatably carried by said truck member, a rotatable driven roller carried by said truck member, means operatively connecting said driven member and said wheels for the transmission of power therebetween, a rotatable driving roller carried by said driving shaft and engageable with the driven roller for transmission of power thereto, spring means operatively urging said driving roller downwardly toward said driven roller, and means operatively connecting said frame structure and truck member for restricting longitudinal movement between the latter and said frame structure and allowing the truck member to be detachably connected to the frame structure.

16. In a miniature power vehicle, the combination of a supporting frame structure including a pair of spaced frame members having horizontally extending portions, power means operatively carried by said frame and having a rotatable driving shaft rotatable on an axis extending longitudinally with respect to the frame structure, a wheel carrying truck member having a pair of transversely disposed frame engaging portions, said frame engaging portions having longitudinally extending arcuate grooves therein positioned on a common diameter approximately equal to the distance between the horizontally extending portions of the spaced frame members, said grooves being of a width to receive such portions of the frame member whereby the truck member is supported thereby for pivotal movement about the axis of said diameter, driven wheels rotatably carried by said truck member, a rotatable driven member carried by said truck member, means operatively connecting said driven member and said wheels for the transmission of power therebetween, a rotatable driving member carried by said driving shaft and engageable with the driven member for transmission of power thereto, spring means operatively urging said driving roller downwardly toward said driven roller, said truck member having an arcuate-shaped recess in an upper face thereof generated about said axis, a leaf spring, one end of which is operatively connected to said frame structure, the other end of said spring having an arcuate-shaped downwardly extending flange thereon of a size to be positioned in said arcuate-shaped recess and operative to restrict longitudinal movement between said truck member and said frame structure.

17. In a miniature power vehicle, the combination of a supporting frame structure including a pair of spaced frame members having horizontally extending portions, power means operatively carried by said frame and having a rotatable driving shaft rotatable on an axis extending longitudinally with respect to the frame structure, a truck body member, the latter being divided into two similar sections, each generally H-shaped in horizontal section, positioned with the leg of one abutting the leg of the other, means extending between abutting leg portions for rigidly securing said sections together, the abutting legs of said sections being shorter in length than the outer legs thereof, said body member having a pair of transversely disposed frame engaging portions, said frame engaging portions having longitudinally extending arcuate grooves positioned on a common diameter approximately equal to the distance between the horizontally extending portions of the spaced frame members, said grooves being of a width to receive such portions of the frame member whereby the truck member is supported thereby for pivotal movement about the axis of said diameter, said truck body member having an arcuate-shaped recess in an upper face thereof generated about said axis, a leaf spring, one end of which is operatively connected to said frame structure, the other end of said spring having an arcuate-shaped downwardly extending flange thereon of a size to be positioned in said arcuate-shaped recess and operative to restrict longitudinal movement between said truck member and said frame structure, said body having a longitudinally extending bore therein, the axis of which is positioned at the juncture of said sections, a shaft rotatably carried in said bore, a transversely extending axle rotatably carried by said body with opposite end portions of said axle being journaled in a corresponding outer leg of the respective body sections, a pair of traction wheels carried by said gear means operatively connecting said shaft and axle for the transmission of power therebetween, said body sections having opposing recesses in their meeting faces extending into the respective connecting portions of each H-shaped section, a driven roller positioned in the composite recess thus formed and rigidly carried by said shaft, said driven member being located substantially at the pivotal axis of said body with said frame structure, a driving roller carried by said driving shaft and engageable with said driven roller for the transmission of power thereto, and spring means operatively urging said driving roller downwardly toward said driven roller.

18. In a miniature power vehicle, a supporting frame structure, a wheeled truck pivotally carried by said frame structure, a rotatable driven roller carried by said truck, means operatively connecting the driven member with one or more of the truck wheels, an electric motor, a rotatable cone-shaped driving roller carried by the shaft of said motor engageable with said driven roller, and spring means connecting said motor and frame structure operative to apply forces on the motor in a direction to urge the driving member carried thereby downwardly into engagement with the driven member.

19. In a miniature vehicle, the combination of a frame structure, a wheeled truck member positioned below said frame structure and rotatable relative to the latter on a vertical axis substantially intersecting he longiudinal center line of the vehicle, complementally formed supporting connections for said frame structure and truck member being spaced transversely outward from said axis and positioned adjacent the longitudinal sides of the frame structure, and said supporting connections for said wheeled truck member comprising longitudinally extending arcuate-shaped grooves.

20. In a miniature powered vehicle, the combination of a frame structure including a pair of spaced frame members having horizontally extending portions, a detachable wheeled truck pivotally and detachably carried by said horizontally extending portions of said spaced frame members, said wheeled truck having an arcuate shaped recess in an upper face thereof generated about said axis of the truck, a leaf spring, one end of which is operatively connected to the frame structure and the other end thereof having an arcuate shaped downwardly extending flange thereon complementally formed to the arcuate shaped recess of the truck and operative to restrict the longitudinal movement between the truck and the frame structure, an electric motor operatively connected to said truck, and said leaf spring forming one of the conductors between said wheeled truck and the track operatively connected to a source of power for the electric motor.

21. In a miniature powered vehicle, the combination of a frame structure including a pair of spaced frame members having horizontally extending portions, a detachable wheeled truck pivotally and detachably carried by said horizontally extending portions of said spaced frame members, said wheeled truck having an arcuate shaped recess in an upper face thereof generated about said axis of the truck, a leaf spring, one end of which is operatively connected to the frame structure and the other end thereof having an arcuate shaped downwardly extending flange thereon complementally formed to the arcuate shaped recess of the truck and operative to restrict the longitudinal movement between the truck and the frame structure, an electric motor operatively connected to said truck, and said leaf spring forming one of the conductors between said wheeled truck and the track operatively connected to a source of power for the electric motor, a second wheeled car supporting truck pivotally connected to said frame structure and electrically insulated therefrom, and electrical conducting means operatively connected to the aforesaid electric motor and operatively connected through the second wheeled car supporting truck to the power means for the electric motor.

22. In a miniature powered vehicle, the combination of a frame structure including a pair of spaced frame members having horizontally extending portions, a detachable wheeled truck pivotally and detachably carried by said horizontally extending portion of said spaced frame members, said wheeled truck having an arcuate shaped recess in an upper face thereof generated about said axis of the truck, a leaf spring, one end of which is operatively connected to the frame structure and the other end thereof having an arcuate shaped downwardly extending flange thereon complementally formed to the arcuate shaped recess of the truck and operative to restrict the longitudinal movement between the truck and the frame structure, an electric motor operatively connected to said truck, and leaf spring forming one of the conductors between said wheeled truck and the track operatively connected to a source of power for the electric motor, a second wheeled car supporting truck pivotally connected to said frame structure and electrically insulated therefrom, electrical conducting means operatively connected to the aforesaid electric motor and operatively connected through the second wheeled car supporting truck to the power means for the electric motor, and a body member forming the side walls and roof of the miniature vehicle complementally formed to the frame structure, permitting the body member to be assembled longitudinally of the axis of the frame member and to permit inspection of the electric motor.

23. In a miniature vehicle, the combination of a frame structure, a wheeled truck member positioned below said frame structure and rotatable relative to the latter on a vertical axis substantially intersecting the longitudinal center line of the vehicle, complementally formed means on the wheeled truck member and the frame structure detachably positioning the axis of the truck member with respect to the axis of the frame structure, complementally formed means on the frame structure and the wheeled truck member permitting relative rotation of the truck member about the vertical axis, and said complementally formed first-mentioned means permitting rotation of the wheeled truck member relatively but restraining longitudinal movement thereof, and said complementally formed second-mentioned means permitting attachment and detachment of the wheeled truck member to the frame structure.

References Cited in the file of this patent

UNITED STATES PATENTS

| Re. 23,728 | Teigman | Oct. 27, 1953 |
| 206,093 | Deschamps | July 16, 1878 |
| 516,935 | Kling | Mar. 20, 1894 |
| 1,276,601 | Whiting | Aug. 20, 1918 |
| 1,347,898 | Eaton | July 27, 1920 |
| 1,603,170 | Vaszin | Oct. 12, 1926 |
| 2,207,171 | Gibson | July 9, 1940 |
| 2,266,722 | Dean | Dec. 16, 1941 |
| 2,276,645 | Bonanno | Mar. 17, 1942 |
| 2,316,805 | Overholser | Apr. 20, 1943 |
| 2,348,616 | Frisbie | May 9, 1944 |
| 2,489,634 | Giger | Nov. 29, 1949 |
| 2,530,762 | Finigan et al. | Nov. 21, 1950 |
| 2,599,138 | Stewart | June 3, 1952 |
| 2,659,317 | Bonanno et al. | Nov. 17, 1953 |

FOREIGN PATENTS

| 837,497 | France | Nov. 12, 1938 |